Jan. 7, 1941.　　　G. H. FISHER ET AL　　　2,227,447
CONDITION CONTROLLER
Filed Oct. 20, 1937　　　2 Sheets-Sheet 1

Inventors
George H. Fisher
Charles B. Spangenberg
By George H. Fisher
Attorney

Jan. 7, 1941.  G. H. FISHER ET AL  2,227,447
CONDITION CONTROLLER
Filed Oct. 20, 1937  2 Sheets-Sheet 2
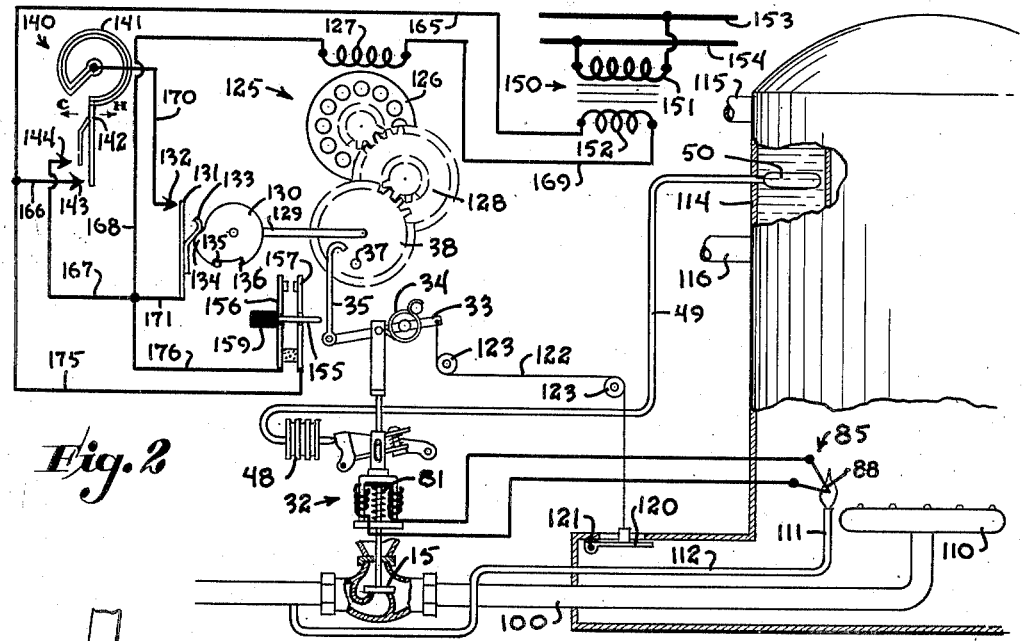
Fig. 2
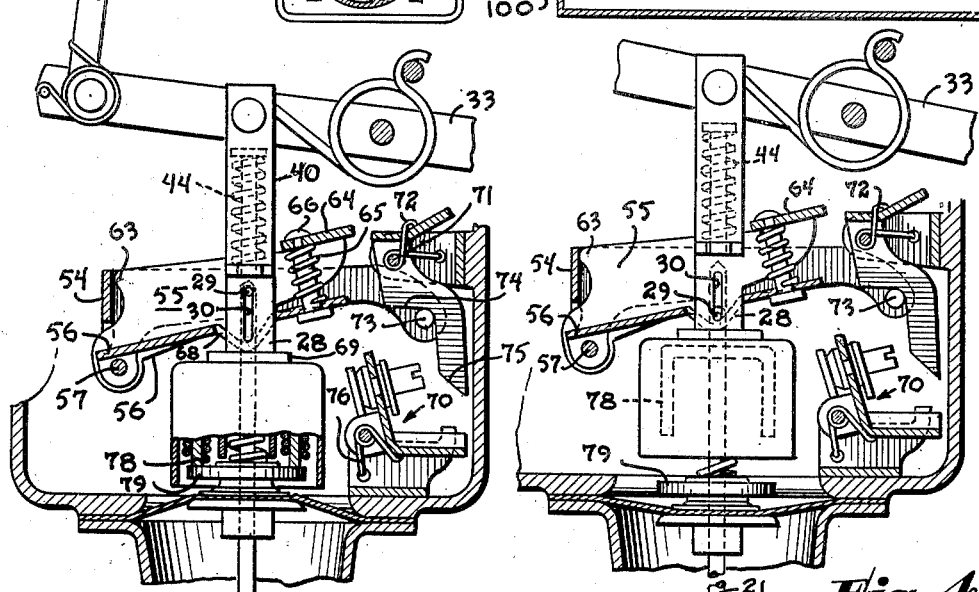
Fig. 3
Fig. 4
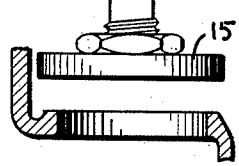
Inventors
George H. Fisher
Charles B. Spangenberg
By George H Fisher
Attorney Patented Jan. 7, 1941

2,227,447

UNITED STATES PATENT OFFICE

2,227,447

CONDITION CONTROLLER

George H. Fisher and Charles B. Spangenberg, Minneapolis, Minn., assignors to Minneapolis-Honeywell Regulator Company, Minneapolis, Minn., a corporation of Delaware Application October 20, 1937, Serial No. 170,009

7 Claims. (Cl. 236—9)

This invention relates to a condition controller and more particularly to improvements in the condition controlling arrangement disclosed in the co-pending application of Frederick S. Denison, Serial No. 150,575, filed June 26, 1937.

In the above referred to application, there is disclosed a condition controlling arrangement employing a valve positioned by a plurality of actuating devices each responsive to a different condition. Upon one of the conditions, such as room temperature, assuming a predetermined valve is moved towards open position, this movement being limited by an abutment which is moved in accordance with the value of a second condition, such as boiler pressure. The valve stem is provided with an extensible connection which is biased to its extended position but which is normally held contracted by an electromagnet energized by a thermo-couple exposed to some temperature condition, such as a pilot flame. In the event that the pilot flame is extinguished for any reason, the biasing means associated with the extensible coupling is effective, by reason of the deenergization of the magnet, to extend the coupling and thereby move the valve to closed position.

While the device of the previous application possesses numerous advantages over similar prior art devices, it has certain defects common to other similar prior are devices which renders its use less desirable. These defects arise by reason of the fact that in order to permit the actuator responsive to the second condition to move the valve towards closed position in spite of the fact that the value of the first condition is such as to call for the valve being open, the valve is biased open by a spring and the actuator responsive to room temperature merely operates to move an abutment away from the end of the valve stem to a position in which the spring is free to open the valve. The actuator responsive to the second condition thus needs to merely oppose this spring when it move the valve toward closed position. This spring results, however, in the necessity of a biasing means in the extensible coupling which is sufficiently strong to overcome the spring biasing the valve open. The result is that a relatively strong biasing means must be employed in the extensible coupling, and in view of the fact that the only force opposing this biasing means is the relatively limited one exerted by the thermo-couple energized electro-magnet, considerable difficulty is experienced in avoiding faulty operation of the coupling.

A second disadvantage of the previous valve is that in the normal or closed position of the valve, the spring biasing the valve open is held compressed. The result of more or less constantly holding the spring compressed is that the spring tends to weaken. Since this spring opposes the action of the actuator responsive to the second condition, any change in the force exerted by this spring results in a change in the position of the valve for a given value of the second condition.

In the third place, where the valve is used to control the flow of a heat producing medium, it is always more adviseable to eliminate, as much as possible, any means tending to bias the valve open. Each such biasing means increases the possibility of the valve remaining open in the event of the failure of certain of the parts of the apparatus.

An object of the present invention is to provide a device of the type previously discussed, in which the disadvantages discussed are eliminated by the substitution for the spring biasing the valve open of a yieldable connection between the actuator responsive to the first condition and the valve.

The advantages of the improved structure as well as other objects of the invention will be apparent from a consideration of the accompanying specification, claims, and drawings of which:

Figure 2 is a schematic view of the temperature control system employing the improved controller of the present invention;

Figure 3 is a sectional view of a portion of the valve mechanism with the valve in open position, and Figure 4 is a sectional view of a portion of the valve mechanism with the valve in closed position as the result of the extinguishment of the pilot flame.

Figure 1:
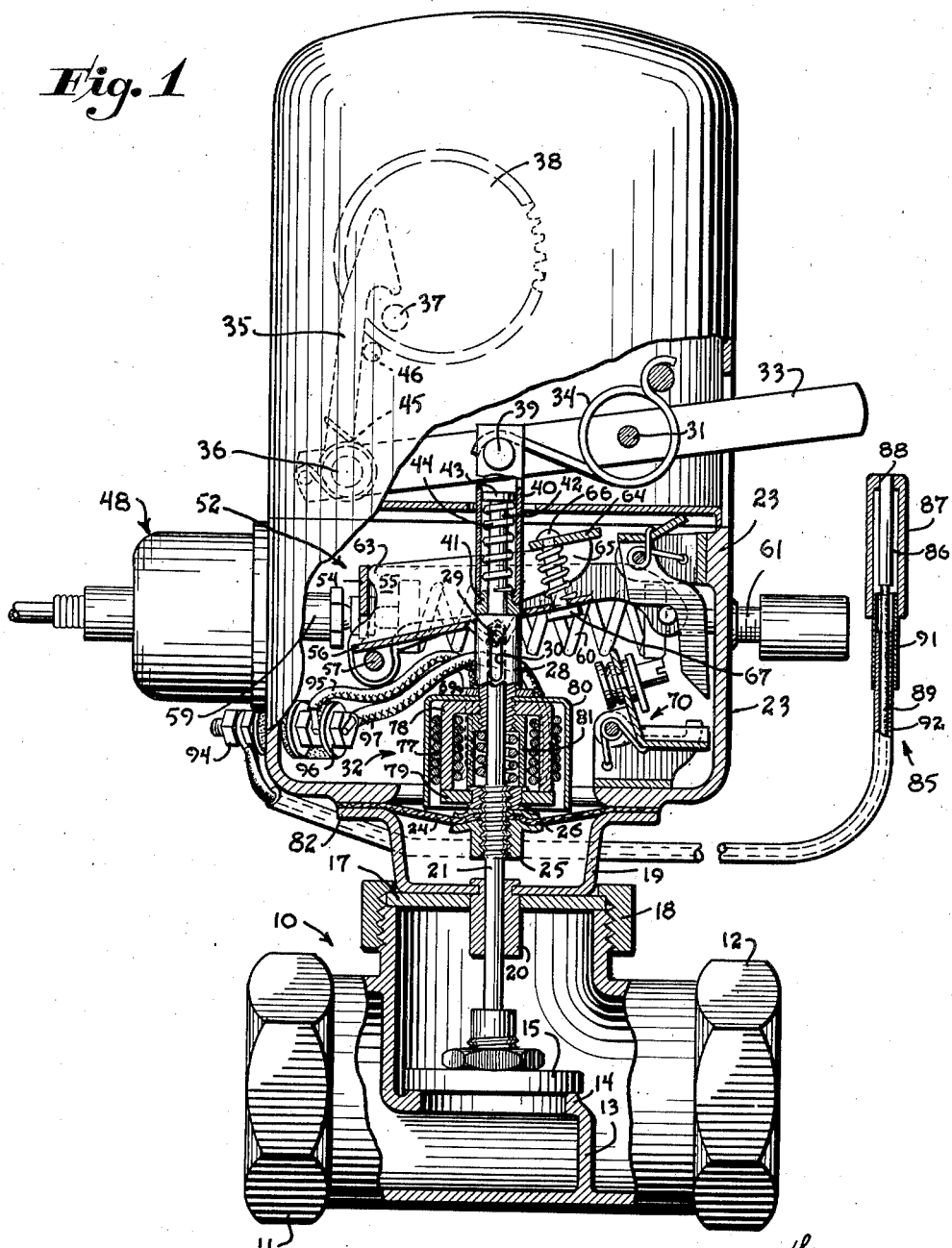
Figure 1 is an elevational view, partly in section, of the improved valve actuating mechanism.

Referring to the drawings for a clearer understanding of the present invention, Figure 1 discloses, as indicated above, the improved valve operating mechanism of the present invention. Referring to this figure, the valve body is generally designated by the reference numeral 10. This valve body 10 comprises an inlet connection 11 and an outlet connection 12. Extending across the interior of the valve body is the usual transverse partition 13 which is apertured to provide a valve seat 14. A valve disc 15 seats on the valve seat 14. The valve body 10 is closed at its upper end by a closure plate 17 which is held in position by a screw thimble nut 18. Secured to the closure plate 17 is a cup-shaped member 19 which has secured to the bottom thereof a valve stem guide 20. This guide 20 extends through an aperture in closure plate 17 and serves to guide the movement of a lower valve stem member 21. The cup-shaped member 19 supports a housing 23 which serves to enclose the valve operating mechanism. Interposed between the members 19 and 23 is a diaphragm 24. The inner portion of diaphragm 24 is clamped between two flanged nuts 25 and 26 which are threadedly secured to the valve stem. The diaphragm acts as a seal-off diaphragm to prevent gas from the valve casing from passing into the housing 23.

The lower valve stem 21 is connected with an upper valve stem 28. The lower stem member 21 telescopes within the lower portion of the upper member 28. The relative movement of these members is limited by a pin 29 which is secured to the lower member 21 and which projects through a slot 30 in the upper member. It will be seen that the pin and slot arrangement forms an extensible connection between the two members so that when pin 29 is in the lowermost portion of the slot, the valve stem constituted by members 21 and 28 is considerably extended. These two members are normally held against extension by an electromagnet arrangement generally indicated by the reference numeral 32, which arrangement will be described in a subsequent paragraph.

As indicated previously, the valve disc 15 is positioned by the cooperative action of several actuating devices. The main actuator, which is normally controlled according to room temperature, comprises a lever 33 which is pivoted at 31. A spring 34 is associated with lever 33 and serves to bias the same in a counter-clockwise direction. Secured to the lever 33 opposite from the pivot point 31 is a hook 35 which is pivoted to lever 33 at 36. This hook 35 is adapted to be engaged by a pin 37 secured to a gear 38. A spring 45 biases hook 35 to the right against a fixed pin 46 so that hook 35 is held in the path of movement of pin 37. The gear 38 is driven by a motor, not shown in Figure 1. On energization of the motor, the gear 38 is rotated in a clockwise direction. The operation of the motor in the positioning of lever 33 will be more apparent from a description of the operation of the entire system as shown in Figure 2. Pivotally secured to the lever 33 by a pivot pin 39 is a cylinder 40. This cylinder has a collar 41 threaded into the lower end thereof. The upper end of upper valve stem member 28 is reduced as at 42, and this reduced portion extends through an aperture in collar member 41. The upper end of the reduced portion 42 of valve stem member 28 is provided with a flange 43, and interposed between this flange and the collar 41 is a spring 44. The assemblage including cylinder 40 and spring 44 constitutes a strain release connection between lever 33 and the upper valve stem member 28. So long as the upper movement of valve stem member 28 is relatively unimpeded, this member will travel upwardly whenever lever 33 is rotated in a clockwise direction by the rotation of gear 38 in the same direction. The provision of spring 44, however, permits a change in the position of valve 15 even though lever 33 is in its extreme clockwise position, as will be more apparent from the subsequent description.

A second actuating means comprises a bellows, only the housing of which is shown in Figure 1, and which is generally indicated by the reference numeral 48. As indicated in Figure 2, the bellows 48 is connected through a capillary tube 49 to a bulb 50 containing a vaporizing fluid and placed in a liquid whose temperature controls the operation of the valve. The bellows 48 serves to move valve stem member 28, and consequently the valve disc 15, through a linkage mechanism, generally indicated by the reference numeral 52. This linkage mechanism may be of any type which serves, upon continuous expansion of the bellows 48, to gradually move valve 15 towards its seat until a predetermined minimum open position is reached, whereupon valve 15 is moved to its seat with a snap action. The preferred form of linkage mechanism and the one which is shown in the drawing is that described in the co-pending application of Hugh Kelly, Serial No. 41,097, filed September 18, 1935, which has matured into Patent No. 2,116,605 of May 10, 1938. While the particular form of the linkage mechanism forms no part of the present invention and accordingly has not been illustrated in its detail as in the aforementioned Kelly application, the operation of the same will be briefly described in order to more clearly understand the operation of the actuating means of the present invention.

The linkage mechanism comprises three levers 54, 55 and 56, all of which are pivoted upon a pivot pin 57. Secured to the bellows 48 is a member 59 which bears directly against the lever 54 so that any expansion of bellows 48 causes movement of lever 54 in a clockwise direction. Also bearing against lever 54 is a spring 60, the tension of which may be adjusted by a suitable adjusting means 61. It will be apparent that by suitably adjusting spring 61, the effect of bellows 48 on the position of lever 54 can be correspondingly varied. The adjusting means 61 will ordinarily be calibrated in degrees to indicate the setting of the apparatus. Lever 55 has a portion 63 which normally abuts against lever 54 so that any clockwise movement of lever 54 imparts a similar clockwise movement to lever 55. Secured to the outer end of lever 55 is a flange 64. Extending between flange 64 and lever 56 is a spring 65 which is guided by a pin 66, rigidly secured to the flange 64 and slidably extending through lever 56. Pin 66 is provided with a head 67 engaging the lower surface of lever 56 to limit the movement of this lever away from lever 55. The spring 65 serves to form a strain release connection between levers 55 and 56. So long as the movement of lever 56 is not impeded by a force greater than that required to compress spring 65, any clockwise movement of lever 55 causes a corresponding clockwise movement of lever 56. As indicated most clearly in Figure 3, lever 56 is provided at its lower edge with a turned-down ear 68 which engages a collar 69 threadedly secured to the upper valve member 28. On movement of lever 56 in a clockwise direction, accordingly, the valve stem members 28 and 21 are moved downwardly causing valve 15 to move toward closed position. The spring 65 is chosen so as to require a greater force to compress it than the spring 44 in the connection between lever 33 and upper valve stem member 28. It will, accordingly, be seen that as the temperature to which bulb 50 is subjected rises, causing an expansion of bellows 48, levers 54, 55 and 56 are simultaneously moved in a clockwise direction causing valve 15 to be moved towards closed position against the action of spring 44.

Cooperating with the lever members 55 and 56 are two pivoted catch members 70 and 71, as most clearly indicated in Figure 3. The catch member 70 is biased by a spring 76 in a counterclockwise direction and is designed to engage lever 56 after the same has been moved to a position corresponding to the minimum open position of the valve. A pin 73 is provided on the forwardly extending portion of lever 54 to cooperate with catch 70 and release the same at the proper point against the action of spring 76, as will be described later. The catch 71 is provided with a shoulder 74 against which the flange 64 of lever 55 abuts in valve opening movement. A spring 72 biases catch 71 in a clockwise direction and the pin 73 of lever 54 cooperates with a cam shaped portion 75 of catch 71 to release member 64 against the action of spring 72, as will be more apparent from the subsequent description.

As previously indicated, the electromagnetic arrangement, generally indicated by the reference numeral 32, serves to hold the lower valve stem member 21 and the upper stem member 28 in their retracted position relative to each other so that these two valve members act as a single unit. This electromagnetic connection 32 comprises a core member 78 threadedly secured to the upper valve stem 28 and an armature member 79 secured to the upper nut member 26 and through this member secured to the lower valve stem member 21. The core member 78 is provided with a winding 77 and surrounding the core 78 and winding 77 is a casing 80. The core member 78 is threadedly connected to the upper valve stem member 28, as previously described, and serves to clamp the casing 80 in position. A cup-shaped nut 81 serves to lock the core member 78 in position. Located within this nut 81 is a spring 82 which bears at its upper end against the lowermost portion of the upper valve stem member 28 and bears at its lower end against the nut member 26 which is secured to armature 79 and to valve stem 21. The spring 81 is effective upon deenergization of the electromagnetic connection 32 to move armature 79 relative to core member 78 and to thereby move members 21 and 28 to their extended position in which pin 29 is in the lower portion of slot 30. In so extending the valve stem, valve 15 is moved to its closed position regardless of the position of the upper valve stem member 28. It will, accordingly, be seen that the electromagnetic connection 32 constitutes a safety connection to insure closure of the valve upon deenergization of the connection.

The energization of the electromagnetic connection 32 is controlled by a thermo-couple, generally indicated by the reference numeral 85. This thermo-couple includes the usual elements 86 and 87 of different thermo-electric characteristics. While any two elements of suitable relative thermo-electric characteristics can be employed, it has been found particularly desirable to employ an inner element of Constantan, an alloy comprising approximately 50% nickel and 50% copper, and an outer member 87 of stainless steel. This stainless steel employed may be any suitable stainless steel capable of adequately resisting the heat of the pilot burner flame. The two members 86 and 87 are joined together at 88 to provide the hot junction of the thermocouple. It is to be understood that where the thermo-couple is placed in a pilot flame, it is so placed that the junction 88 is exposed to the pilot flame. The inner member 86 is connected to an insulated conductor 89. The outer member 87 is connected to a copper reducing sleeve 91, which in turn is connected to a copper tube 92 surrounding the insulated conductor 89. The inner conductor 89 is connected through a lead-in terminal 94 to a conductor 95 within the housing 23, as best indicated in Figure 1. The copper tube 92 which functions as the other conductor connected to the thermo-couple is connected through a second lead-in terminal 96 to a conductor 97, also located within the housing 23. The conductors 95 and 97 are connected to opposite ends of the electromagnet winding 77. The conductors 89, 92, 95, 97 and the winding 77 are of relatively large cross section. The result is that very little resistance is offered to the current generated by the relatively small electromotive force produced by thermo-couple 85. Accordingly, in spite of the very small electromotive force, a relatively large current flows through winding 77. Moreover, core member 78 and armature member 79 are preferably of "Permalloy" or some other material of very high permeability. Consequently, the flux density in core member 78 and armature 79 is sufficiently great, when the thermo-couple is energized, that when these two members are moved together by some external force the attraction between the two members is sufficient to resist the action of spring 81 to separate them.

In Figure 2, the device of the present invention is shown embodied in a temperature control system. The various elements of the valve have been given the same reference characters as in the preceding description. The valve 15 is shown as controlling the flow of gas through a pipe 100 leading to a gas burner 110. Associated with the gas burner 110 is a pilot burner 111 which is connected through a pipe 112 to the main supply pipe 100 at a point behind the valve 15. Consequently, under all normal conditions, the pilot burner 111 is maintained ignited and serves in the conventional manner to ignite the main burner 110 upon gas being admitted thereto by the opening of valve 15.

The gas burner 110 forms the burner portion of a hot water boiler, the boiler portion of which is broken away at 114 to show the water therein. Pipes 115 and 116 lead from and to the boiler, respectively. Admission of secondary air to the burner is controlled by a secondary air damper 120. This damper is pivoted at 121 and is biased to an open position. A chain 122 or other similar device extends over pulleys 123 and is connected to the lever 33 of the valve mechanism. As previously indicated, the lever 33 is rotated in a clockwise direction to open the valve. Such clockwise rotation of lever 33 serves to permit the secondary air damper 120 to move to open position.

As previously indicated, the gear 38 is driven by an electric motor. This motor is indicated in Figure 2 by the reference numeral 125. The motor 125 comprises a rotor 126 and a field winding 127. A gear train 128 serves to connect rotor 126 with the gear 38. As previously indicated, energization of the motor 125 causes clockwise rotation of gear 38.

Connected to the gear 38 is a shaft 129 which drives a cam 130, which in turn actuates a switch blade 131. Switch blade 131 is adapted to be moved into engagement with contact 132, this movement being effected by cam follower 133, secured to switch blade 131, engaging a raised portion 134 of the cam 130. The cam 130 is secured to shaft 129 through a slip friction connection which causes, upon initial movement of shaft 129, an initial movement of cam 130 after which the cam merely slides upon the shaft 129. The movement of the cam is limited by a pin 135 engaging the opposite ends of a recess 136 in the cam. The effect of this is that upon reverse rotation of shaft 129, cam 130 is immediately rotated in a reverse direction. The switch consisting of switch blade 131 and contact 132 operates to establish a maintaining circuit for the motor field winding 127, as will be more apparent from the subsequent description.

A thermostat 140 is provided to control the operation of motor 125. This thermostat is preferably located in a room or other space whose temperature is to be controlled. The thermostat comprises a bimetallic element 141 to which is secured a contact blade 142. Contact blade 142 is adapted to engage with fixed contacts 143 and 144. Contact blade 142 is so spaced relative to contacts 143 and 144 that upon movement of contact arm 142 to the left, it is first moved into engagement with contact 143 and thereafter moved into engagement with contact 144. Bimetallic element 141 is so arranged that upon a temperature decrease, contact arm 142 is moved to the left and upon a temperature increase to the right, as indicated by the legends C and H.

A step-down transformer 150 is used to supply low voltage power for operation of the system. Transformer 150 comprises a line voltage primary 151 and a low voltage secondary 152. The line voltage primary 151 is connected to line wires 153 and 154 leading to a suitable source of power (not shown).

One of the advantages of the type of device to which the present invention relates is the fact that it is possible to operate it safely in the absence of electrical power. The valve may at any time be moved to open position providing the boiler temperature is sufficiently low and the pilot is ignited by merely grasping lever 33 and turning it in a clockwise direction. A plunger 155 is provided for the purpose of retaining the lever 33 in its valve open position when so moved. It will be readily apparent that if lever 33 has been rotated in a clockwise direction sufficiently, plunger 155 can be moved inwardly under the left-hand end of lever 33 and retained in this position. A switch consisting of switch blades 156 and 157 is provided for the purpose of insuring a return of the valve to automatic control upon power restoration. The switch blade 157 is relatively fixed whereas the switch blade 156 is moved to the right upon movement to the right of plunger 155 by reason of the engagement of a push button portion 159 of plunger 155 with the blade 156. It will, accordingly, be seen that when plunger 155 is moved to the right so as to retain lever 33 in its valve open position, switch blades 156 and 157 are moved into electrical contact.

Operation

The various elements in Figure 2 are shown in the position which they occupy when the pilot burner is ignited, the temperature to which bulb 50 is responsive is relatively low, and the temperature to which thermostat 140 is responsive is at or above the desired value. Let it be assumed now that the temperature to which thermostat 140 is responsive decreases so as to cause first the engagement of switch blade 142 with contact 143 and then with contact 144. Engagement of blade 142 with contact 143 has no effect whatsoever. As soon, however, as the blade engages contact 144, the following circuit is established to motor field winding 127: from the left-hand terminal of secondary 152 through conductors 165 and 166, contact 143, contact blade 142, contact 144, conductors 167 and 168, motor field winding 127, and conductor 169 to the other terminal of secondary 152. The establishment of this circuit causes field winding 127 to be energized with the result that the motor rotates in a direction to cause clockwise rotation of gear 38. After an initial movement of gear 38, cam 130 is effective to move switch blade 131 into engagement with contact 132. When this occurs, the following maintaining circuit is established to field winding 127: from the left-hand terminal of secondary 152 through conductors 165 and 166, contact 143, switch blade 142, bimetallic element 141, conductor 170, contact 132, switch blade 131, conductors 171 and 168, field winding 127, and conductor 169 to the other terminal of secondary 152. It will be noted that the new circuit is independent of contact 144 so that it is necessary for the temperature to rise to a point wherein switch blade 142 is separated from contact 143 before the motor is deenergized. The result of this is that an appreciable change in temperature is necessary between the starting and stopping of the motor. If it were not for this differential, any slight chattering of the thermostat 140 would cause rapid energization and deenergization of the motor 125.

Slightly after gear 38 has rotated sufficiently to cause switch blade 131 to be moved into engagement with contact 132 to establish the maintaining circuit previously traced, pin 37 is moved into engagement with the hook 35 so that hook 35 is moved upwardly rotating lever 33 in a clockwise direction. The result of this is that the various elements of the valve mechanism will move to the position shown in Figure 3 wherein valve 15 is at its full open position admitting the maximum amount of gas to the burner 110. The result of this is that the temperature of the water in boiler 114 will begin to rise so as to cause gradual expansion of bellows 48. The effect of this, as previously explained, is to cause a clockwise movement of levers 54, 55 and 56, which in turn causes movement of valve 15 towards closed position. This movement of valve 15 is permitted by reason of the yieldable connection including spring 44 and cylinder 40.

Under normal conditions, valve 15 will be moved to a position relative to its seat to maintain substantially just the right amount of gas flow so that upon substantially continuous operation of the burner, the room temperature is maintained at the desired value. If, however, the temperature of the water becomes sufficiently high to cause valve 15 to be moved to a position requiring too small a flow to properly sustain combustion, the valve is abruptly moved to full closed position until either the water temperature or the room temperature is reduced. Referring to Figure 3, it will be noted that the upper leg of catch member 70 lies in the path of movement of lever 56. The apparatus is so designed that when the valve 15 reaches a desired minimum open position, further movement of lever 56 is prevented by catch 70. In view, however, of the strain release spring 65, further movement of levers 54 and 55 is possible. The result of such movement is that pin 73 is moved down towards the horizontal arm of the pivoted catch 70. As soon as this movement has continued sufficiently far, the pin 73 is effective to rock the catch in a clockwise direction against the action of spring 76, moving the upwardly extending leg thereof out from underneath the lever 56. As soon as this takes place, lever 56 is free to move downwardly and spring 65 by reason of the compression under which it has been placed is effective to cause such movement with a very abrupt action. Thus valve disc 15 is caused, during the initial expansion of bellows 48, to assume a position corresponding to the temperature to which bulb 50 is subjected. As soon, however, as a minimum flow position is reached, further movement of the valve 15 is temporarily terminated, and as soon as the temperature to which bulb 50 is subjected has risen sufficiently the valve is moved with a snap action to its seat. The effect of this is that the valve is gradually throttled during the initial portion of its movement and is moved with a snap action during the final portion of its movement. In this manner, any danger of a pop-back in the gas mixer, by reason of too small a gas flow to the burner, is avoided.

The moving of valve disc 15 to its closed position will terminate the operation of burner 110 and will eventually cause a reduction in the water temperature to which bulb 50 is subjected. This will cause counter-clockwise movement of lever 54. Upward movement of the valve 15 is prevented, however, by reason of the fact that upon valve 15 being moved to its closed position the flange 64 of lever 55 was moved under the shoulder 74 of catch member 71. Accordingly, valve 15 remains in its closed position until the temperature to which bulb 50 is subjected has dropped to a point where lever 54 is moved in a counter-clockwise direction sufficiently to cause engagement of the pin 73 with the inclined surface 75 of catch member 71. When this occurs, pin 73 is effective to rotate the catch member 71 in a counter-clockwise direction against the action of its biasing spring 72 to cause the latching surface 74 to be moved out of engagement with lever 64. When this occurs, the spring 44 in the connection between lever 33 and the upper valve member 28 is effective to cause valve 15 to be moved abruptly until shoulder 63 of lever 55 again abuts lever 54. Thereafter the position of valve 15 will be determined by the position of lever 54 as determined by the temperature to which bulb 50 is subjected.

Whenever the space temperature or other temperature to which thermostat 140 is responsive rises to a high enough value to cause separation of contact blade 142 from contact 143, the circuit to field winding 127 is interrupted. The biasing spring 34 is thereupon effective to rotate gear 38, the gear train 129, and the motor 125 in a direction opposite to that in which they moved upon energization of the motor. The result is that valve 15 is moved to closed position regardless of the boiler water temperature.

If when the valve is in its open position, as shown in Figure 3, the burner pilot 111 is extinguished for any reason whatsoever, the temperature to which the hot junction of thermocouple 85 is subjected will immediately decrease so that thermo-couple 85 no longer supplies sufficient energy to the electromagnetic connection 32 to resist the action of spring 81. This spring 81 under these circumstances is immediately effective to extend the connection between the lower valve stem member 21 and the upper valve stem member 28 so as to cause valve disc 15 to be moved to its seat. The position assumed by the various elements under these conditions is shown in Figure 4. When such closure of the valve occurs, all that it is necessary to do to again cause normal operation thereof is to light the pilot burner and to then change the adjustment of thermostat 140 momentarily so that it ceases to call for heat, deenergizing motor 125 causing the upper valve stem member 28 to be moved downwardly into valve closed position wherein the core member 78 is in engagement with the armature member 79. In view of the fact that the pilot burner 111 has been re-ignited so as to reenergize the winding of the core 78, the electromagnetic connection is again effective and as soon as there is a call for heat the valve stem members 21 and 28 will again move together as a unit.

As previously indicated, this type of device is particularly adapted for operation in the event of power failure. All that it is necessary to do under these circumstances is to grasp the right-hand end of lever 33 rotating it in a clockwise direction to a substantial valve open position wherein plunger 155 may be moved under the left-hand end of lever 33 to hold the valve in such substantial open position. With the elements in this position, the valve is no longer under control of thermostat 140. The operation, however, is entirely safe inasmuch as the actuator comprising bellows 48 and bulb 50 as well as the pilot responsive actuator is still effective. Thus, under these circumstances as the boiler water temperature rises, the valve is moved towards closed position in the manner previously described, thus preventing an excessive boiler temperature. At the same time, if at any time the pilot burner 111 is extinguished the valve is abruptly moved to closed position and cannot again be reopened until the pilot burner 111 is re-ignited. The moving of plunger 155 to the right causes switch blade 156 to be moved into contact making engagement with switch blade 157, as noted previously. The engagement of these two contacts has no effect so long as the power is off. As soon, however, as power is restored, an energizing circuit is established to field winding 127 as follows: from the left-hand terminal of secondary 152 through conductors 166 and 175, switch blade 157, switch blade 156, conductors 176 and 168, field winding 127, and conductor 169 to the other terminal of secondary 152. It will be noted that the establishment of this circuit is entirely independent of thermostat 140 so that field winding 127 will be immediately energized upon restoration of power. The plunger 155 is so located that it does not hold valve 15 in its completely open position. Accordingly, as soon as the field winding 127 is energized in the manner just explained, lever 33 and valve 15 are moved slightly further, moving lever 33 out of engagement with plunger 155. As soon as this occurs, the bias upon switch blade 156 is effective to retract the same to the left, at the same time moving plunger 155 back to the position shown in the drawing wherein it is out of the path of movement of lever 33. This results in motor 125 again being placed under control of thermostat 140.

It will be noted that by reason of the elimination of any spring biasing valve 15 open, spring 81 inserted between the two elements of the electromagnetic connection 32 need be capable of exerting only a relatively small force. At the same time by elimination of the spring biasing the valve open, the only spring that is under tension when the valve is in its closed position is the spring 81. Thus, the only spring which can possibly be weakened as a result of the fact that it is maintained in a permanent stressed condition is spring 81. However, by reason of the fact that this spring's only function is to separate the members against what little residual magnetism may remain and hold the valve firmly on its seat, it can be considerably weakened without in any way interfering with the operation of the system. The spring whose tensional strength affects the values at which the apparatus is operated is the spring 44 which by reason of its location is an element of a strain release connection between lever 33 and the valve stem is under no stress whatsoever when the valve is closed. It will be readily apparent that the improved device of this present application overcomes the disadvantages pointed out in the device described and claimed in the co-pending Denison application. It will further be seen that these disadvantages have been overcome without complicating the arrangement in any respect whatsoever.

While we have shown a specific embodiment of our invention, it is to be understood that this is for purposes of illustration and that our invention is limited only by the scope of the appended claims.

We claim as our invention:

1. In combination, a unitary condition controlling element movable between first and second positions, a two position motor means, yieldable connecting means between said motor means and said element, means controlling said motor means in accordance with the value of a first condition and operative upon said condition assuming a predetermined value to cause said motor means to move to a position corresponding to the second position of said element and hence yieldably to move said element towards said second position, and means including a device responsive to a second condition and operative gradually to move said element against the action of said yielding connection back towards said first position as said second condition changes in a predetermined direction, said yieldable connecting means being in a state of relaxation whenever the position of said element is determined solely by said motor means.

2. In combination, a unitary condition controlling element movable between first and second positions, a two position motor means, yieldable connecting means between said motor means and said element, means controlling said motor means in accordance with the value of a first condition and operative upon said condition assuming a predetermined value to cause said motor means to move to a position corresponding to the second position of said element and hence yieldably to move said element towards said second position, and means including means responsive to a second condition the value of which is normally increased as a result of said condition controlling element being moved toward said second position, said means being operative upon the value of said condition increasing to move gradually said element against the action of said yielding connection back towards said first position, said yieldable connecting means being in a state of relaxation whenever the position of said element is determined solely by said motor means.

3. In combination, a condition controlling element movable between first and second positions, a two position motor means, yieldable connecting means between said motor means and said element, means controlling said motor means in accordance with the value of a first condition and operative upon said condition assuming a predetermined value to cause said motor means to move to a position corresponding to the second position of the element and hence yieldably to move said element towards said second position, means including a device responsive to a second condition and operative gradually to move said element against the action of said yielding connection back towards said first position as said second condition changes in a predetermined direction, an extensible connection between said yieldable connecting means and said element, yieldable means tending to extend said connection to move said element to said first position, and condition responsive means restraining said yieldable means.

4. In combination, a main burner, a pilot burner, a valve controlling the flow of fuel to said main burner and movable between maximum and minimum flow positions, a motor means, yieldable connecting means between said motor means and said valve, means controlling said motor means in accordance with a first condition indicative of the demand for burner operation and operative upon said condition assuming a predetermined value to cause said motor means yieldably to move said valve towards said maximum flow position, means responsive to a second condition indicative of the demand for burner operation to move said valve against the action of said yieldable connection back towards said minimum flow position as said second condition changes in a predetermined direction, an extensible connection between said yieldable connecting means and said valve, yieldable means tending to extend said connection and move said valve to closed position, and means responsive to the temperature adjacent said pilot burner operative to restrain said yieldable means when said pilot burner is ignited.

5. In combination, a main burner, a pilot burner, a valve controlling the flow of fuel to said main burner and movable between maximum and minimum flow positions, a motor means, yieldable connecting means between said motor means and said valve, means controlling said motor means in accordance with a first condition indicative of the demand for burner operation and operative upon said condition assuming a predetermined value to cause said motor means yieldably to move said valve towards said maximum flow position, means responsive to a second condition indicative of the demand for burner operation to move said valve against the action of said yieldable connection back towards said minimum flow position as said second condition changes in a predetermined direction, an extensible connection between said yieldable connecting means and said valve, yieldable means tending to extend said connection and move said valve to closed position, and means including an electromagnet and a thermo-couple exposed to the pilot flame and adapted to energize said electromagnet, said last named means being operative to restrain said yieldable means when said pilot burner is ignited.

6. In combination, a valve movable between minimum and maximum flow positions, a valve stem connected to said valve, a motor, connecting means between said motor and said valve stem including a connection yieldable only in the direction of the minimum flow position, means including a device responsive to a first condition for controlling the energization of said motor and effective upon said first condition assuming a predetermined value yieldably to move said valve towards said maximum flow position, an extensible connection in said valve stem, yieldable means tending to extend said connection to move said valve to minimum flow position, means responsive to a second condition operative to restrain said yieldable means so long as said second condition exists, and means including a device responsive to a third condition and operative on said valve stem at a point between said extensible and said yieldable connection to move said valve towards said minimum flow position as said third condition changes in a predetermined direction.

7. In combination, a valve movable between minimum and maximum flow positions, a valve stem connected to said valve, a motor, connecting means between said motor and said valve stem including a connection yieldable only in the direction of the minimum flow position, means including a device responsive to a first condition for controlling the energization of said motor and effective upon said first condition assuming a predetermined value yieldably to move said valve towards said maximum flow position, an extensible connection in said valve stem, yieldable means tending to extend said connection to move said valve to minimum flow position, an electromagnet operative when energized to restrain said yieldable means, a thermo-couple responsive to a temperature condition and operative normally to maintain said electromagnet energized, and means including a device responsive to a third condition and operative on said valve stem at a point between said extensible and said yieldable connection to move said valve towards said minimum flow position as said third condition changes in a predetermined direction.

GEORGE H. FISHER.
CHARLES B. SPANGENBERG.